July 9, 1963 A. ARMEN ETAL 3,097,185
GRAFT COPOLYMERS COMPRISED OF CERTAIN ACRYLAMIDE AND
METHACRYLAMIDE MONOMERS ON POLYVINYLLACTAMS AND
IMPROVED ACRYLONITRILE POLYMER COMPOSITIONS
OBTAINABLE THEREWITH
Filed July 29, 1958

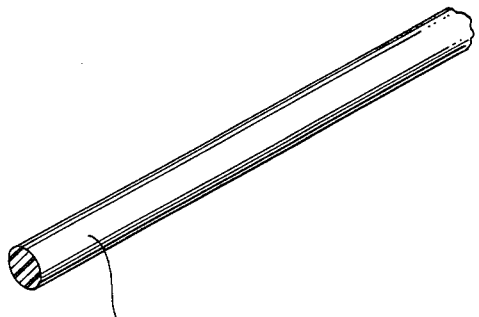

FILAMENTOUS ARTICLE COMPRISED OF AN ACRYLONITRILE POLYMER HAVING INCORPORATED THEREIN A GRAFT COPOLYMER COMPRISING AN ACRYLAMIDE AND/OR METHACRYLAMIDE MONOMER GRAFT COPOLYMERIZED UPON A VINYL LACTAM POLYMER SUBSTRATE.

INVENTORS
Ardy Armen
Forrest A. Ehlers
BY Jerome Rudy
ATTORNEY

United States Patent Office 3,097,185
Patented July 9, 1963

3,097,185
GRAFT COPOLYMERS COMPRISED OF CERTAIN ACRYLAMIDE AND METHACRYLAMIDE MONOMERS ON POLYVINYLLACTAMS AND IMPROVED ACRYLONITRILE POLYMER COMPOSITIONS OBTAINABLE THEREWITH
Ardy Armen, Denbigh, Va., and Forrest A. Ehlers, Walnut Creek, Calif., assignors to The Dow Chemical Company, Midland, Mich., a corporation of Delaware
Filed July 29, 1958, Ser. No. 751,733
17 Claims. (Cl. 260—45.5)

The present invention resides in the general field of organic chemistry and contributes specifically to the polymer art, especially with respect to certain graft copolymer compositions and fiber-forming polymer blends obtainable therewith. It is particularly concerned with graft copolymers of certain acrylamide and methacrylamide monomers, hereinafter more precisely delineated, that are graft copolymerized upon polyvinyllactams, which graft copolymers have especial utility as dye-receptive and stabilizing additaments for acrylonitrile polymer compositions which, advantageously, may be of the fiber-forming variety. The invention is also concerned with the compositions that may be obtained by blending the graft copolymers with acrylonitrile polymers, as well as with shaped articles which have been fabricated from such compositions and which, as a consequence, have significantly enhanced properties and characteristics as regards improvements in and relating to enhanced dye-receptivity and natural stability to various deteriorating influences, including stability against becoming deleteriously influenced and degraded upon exposure to heat at elevated temperatures and to light.

Within the scope and purview of the invention, there is comprehended (1) the various novel and utile graft copolymers of the indicated variety; (2) the advantageous polymer compositions, particularly fiber-forming compositions, obtained by blending the graft copolymers with acrylonitrile polymers; (3) various shaped articles fabricated from and comprised of the graft copolymer-containing acrylonitrile polymer compositions; and (4) methods for the preparation of the above-indicated compositions.

It is the main purpose and primary design of the present invention to provide and make available graft copolymers of certain acrylamide and methacrylamide monomers upon vinyl lactam polymers that are especially well suited for being incorporated in acrylonitrile polymer compositions, particularly compositions of polyacrylonitrile, to serve in the indicated dual capacity of dye-assisting adjuvants and stabilizing ingredients. It is also a principal aim and chief concern of the invention to provide and make available acrylonitrile polymer compositions and shaped articles therefrom that contain the above-indicated and hereinafter more fully delineated type of graft copolymeric additaments which compositions have, as intrinsic distinguishing characteristics, excellent receptivity of and acceptability for any of a wide variety of dyestuffs and efficacious natural stability to heat and light, as well as to certain chemical conditions, such as alkaline environments.

The graft copolymers of the present invention which have the indicated capacity and utility as additaments for acrylonitrile polymer compositions are comprised of a polyvinyllactam trunk or base upon which there is graft copolymerized certain acrylamide and methacrylamide monomers of the variety hereinafter described.

The polymer blend compositions of the present invention which fulfill the above-indicated ends and offer corollary advantages and benefits, particularly as fiber-forming compositions as will hereinafter be manifest, are, in essence, comprised of an intimate and practically inseparable blend or alloy constitution of (A) an acrylonitrile polymer that contains in the polymer molecule at least about 80 percent by weight of acrylonitrile which, preferably, is of the fiber-forming variety and, most advantageously, is polyacrylonitrile and (B) a minor proportion of the above-indicated variety of beneficial graft copolymeric additament that functions in the described manner.

The methods of the invention by which the herein contemplated advantageous compositions may be made involve preparation of the graft copolymer, as well as incorporation of a minor proportion of the graft copolymer product as a beneficial additament in and with the acrylonitrile polymer base by any of several beneficial techniques, hereinafter more thoroughly defined, adapted to suitably accomplish the desired result.

Without being limited to or by the specific embodiments and modes of operation set forth, the invention is illustrated in and by the following didactic examples wherein, unless other wise indicated, all parts and percentages are to be taken on a weight basis.

*Example A*

Into a 5 liter reactor that was equipped with an efficient agitator, a nitrogen inlet, and a total reflux condenser, there was charged about 1860 grams of poly-N-vinyl-2-pyrrolidone (PVP) having a Fikentscher K-value of about 57; about 210 grams of monomeric acrylamide; about 4.2 grams of potassium persulfate; and about 5970 grams of water. The resulting mixture had a pH of about 7.2. Under a continuously maintained atmosphere of nitrogen and with continued stirring, the reaction mass was maintained at a temperature of about 60° C. over a 4.5 hour period. At the end of this time, the reaction was terminated. About 75 percent of the monomers were found to have been converted to a water-soluble graft copolymeric product having a Fikentscher K-value of about 73, which was obtained in solution in the aqueous reaction mass.

Polyacrylonitrile fibers containing about 4.8 percent of the above copolymer product were prepared by impregnating filamentary structures that were in aquagel condition (after having been salt-spun and wet-stretched) in and with an aqueous solution of the graft copolymer that contained about 3 percent of dissolved graft copolymer solids. The polyacrylonitrile aquagel fiber that was employed had been obtained by extruding a spinning solution of fiber-forming polyacrylonitrile comprised of about 10 parts of the polymer dissolved in 90 parts of a 60 percent aqueous solution of zinc chloride through a spinnerette having 750 individual 6 mil diameter orifices into an aqueous coagulating bath that contained about 43.4 percent of dissolved zinc chloride to form a multiple filament tow. After being spun, the tow bundle of coagulated polyacrylonitrile aquagel fiber was washed substantially free from salt upon being withdrawn from the coagulating bath. The aquagel fiber, containing about two parts of water for each part of polymer therein, was then passed through the mentioned aqueous impregnating bath of the dissolved copolymer additive so as to become impregnated therewith to the indicated extent. After the impregnation, the aquagel fiber was stretch drawn for orientation to a length that was about thirteen times its original extruded length.

Following the impregnation and stretching, the aquagel fiber was irreversibly dried for about 15 minutes at 140° C. to destroy the water-hydrated structure and convert it to a finished fiber form. The finally obtained 2.9 denier fiber product has a tenacity of about 3.0 grams per denier, an elongation of about 34 percent and a dry yield strength of about 1.05 grams per denier. The copolymer-containing acrylonitrile polymer fiber product is found to have excellent natural stability to heat and light as well as against becoming degraded under the influence of aqueous alkaline media at pH levels as high as 10.

In addition, the graft copolymer-containing sample has good color and hand and is dyeable with all classes of dyestuffs as applied under normal dyeing conditions.

The fiber product dyed well to deep and level shades of coloration with Calcodur Pink 2BL, a direct type of dyestuff (Color Index 353), and Sevron Brilliant Red 4G, a basic dye formerly known as Basic Red 4G (Color Index Basic Red 14).

The dyeing with Calcodur Pink 2BL was performed at the 4 percent level according to conventional procedure in which the fiber sample was maintained for about one hour at the boil in the dye bath which contained the dyestuff in an amount equal to about 4 percent of the weight of the fiber. The dye bath also contained sodium sulfate in an amount equal to about 15 percent of the weight of the fiber and had a bath-to-fiber weight ratio of about 30:1, respectively. After being dyed, the fiber was rinsed thoroughly with water and dried for about 20 minutes at 80° C. The dye-receptivity of the Calcodur Pink 2BL-dyed fiber was then evaluated spectrophotometrically by measuring the amount of monochromatic light having a wave length of about 520 millimicrons from a standard source that was reflected from the dyed sample. A numerical value on an arbitrarily designated scale from 0 to 100 was thereby obtained. This value represented the relative comparison of the amount of light that was reflected from a standard white tile reflector that had a reflectance value of 316 by extrapolation from the 0–100 scale. Lower reflectance values are an indication of better dye-receptivity in the fiber. For example, a reflectance value of about 20 or 25 to 50 or so for acrylonitrile polymer fibers dyed with 4 percent Calcodur Pink 2BL is generally considered by those skilled in the art to be representative of a degree of dye-receptivity that readily meets or exceeds the most rigorous practical requirements and is ordinarily assured of receiving general commercial acceptance and approval. The 4 percent Calcodur Pink 2BL reflectance value of the copolymer-containing fiber product was less than 25.

The fiber product also dyed well with each of the dyestuffs included in the following tabulation when applied in the conventional manner:

| Type | Name | Color index |
|---|---|---|
| Basic | Sevron Yellow R | Basic Yellow 11. |
| Do | Calcozine Brilliant Green. | Basic Green 1. |
| Disperse Acetate | Eastman Blue BNN | Disperse Blue 3. |
| Do | Celliton Fast Pink FF3BA. | Disperse Red 11. |
| Direct Aftertreated | Cuprofix Navy Blue SL. | Direct Blue 171. |
| Acid-Neutral Premetallized. | Cibalan Black BGL (Available from Ciba). | Unknown. |
| Do | Supralan Blue NB (Available from Gen. Dyestuff). | No Number. |
| Sulfur | So-Dyc-Sul Liquid Navy GIFC | Sulfur Blue 7. |
| Naphthol | Naphthol AS-TR coupled with Fast Red Salt TRN. | Azoic Coupler 8 and Azoic Diazonium 11. |

*Example B*

The procedure of the first example was essentially repeated in several runs using the same monomeric acrylamide to prepare graft copolymers with the monomer from the following charges which were polymerized in the same way as in the first example for 16 hours at 50° C.

The constitution of each charge and the results are set forth in the following tabulation:

| Run | "B1" | "B2" | "B3" | "B4" |
|---|---|---|---|---|
| Acrylamide, parts | 24 | 24 | 24 | 24 |
| PVP (K-57), parts | 216 | 216 | 216 | 216 |
| Water, parts | 954 | 954 | 954 | 954 |
| $K_2S_2O_8$ parts | 0.24 | 0.48 | 0.96 | 0.50 |
| pH of charge | 6.4 | 6.4 | 6.4 | 7.5 |
| Per cent conversion to graft copolymer. | 94 | 92 | 94 | 94 |
| Fikentscher K-value of graft copolymer product | 64 | 63 | 61 | -------- |

Each of the graft copolymer products was an excellent adjuvant for acrylonitrile polymer fibers when employed in the manner of the first example.

Excellent results may also be obtained when the foregoing is repeated to prepare graft copolymer additives from poly-N-vinylcaprolactam, poly-N-vinylpiperidone, poly-N-vinyl-5-methyl-2-pyrrolidone and other vinyl lactam polymers using the same or any other of the monomeric components indicated as being useful in the practice of the invention. Results similar to those set forth in the foregoing can likewise be obtained when the graft copolymer additaments are incorporated in polyacrylonitrile and other acrylonitrile polymer fibers to provide articles in accordance with the present invention by blending the graft copolymer and the fiber-containing acrylonitrile polymer in a spinning composition or dope prior to its extrusion into filamentary products by either wet spinning or dry spinning techniques. In such instances, incidentally, it may be desirable (in order to secure optimum benefit in the practice of the invention) to employ relatively larger quantities of the graft copolymeric additament than when surface impregnation is performed so that the presence of effective quantities of the additament at or near the peripheral portion of the article is assured.

The acrylamide and methacrylamide monomers that are employed for the preparation of the graft copolymeric additaments are of the general formula:

$$CH_2=CZCONQ_2 \qquad (I)$$

wherein Z is hydrogen or methyl and Q is hydrogen, methyl or ethyl. Advantageously, acrylamide or methacrylamide are employed as the monomeric constituents for the preparation of the graft copolymers of the invention. If desired, however, such monomers as N,N-dimethyl-acrylamide, N,N-diethyl acrylamide, N,N-dimethyl-methacrylamide and N,N-diethyl-methacrylamide may also be utilized with benefit. Of course, mixtures of the various acrylamide and methacrylamide monomers may also be used.

The vinyl lactam polymers that are utilized in the preparation of the graft copolymeric additaments of the present invention may be any of those (or their mixtures) which are variously characterized and generically known to the art as poly-N-vinyl lactams or poly-1-vinyl lactams. Such polymers as have been described or which may be prepared from the mentioned series of monomers that are involved in U.S. Patents Nos. 2,265,450; 2,371,804; and 2,335,454 may be suitably employed in the practice of the invention. Advantageously, as has been indicated, the poly-N-vinyl lactams that are employed are poly-N-vinyl-2-pyrrolidone or poly-N-vinylcaprolactam, particularly the former. Beneficially, although not in a limiting sense, the poly-N-vinyl lactam that is employed may have a Fikentscher K-value from about 30 to 90, advantageously from about 45 to 65.

The vinyl lactam polymers that are most useful for the preparation of the graft copolymeric additaments may be represented by the structure:

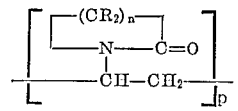

(IIa)

wherein each R is independently selected from the group consisting of hydrogen, methyl and ethyl, $n$ is an integer from 3 to 5 and $p$ has a numerical value from about 300 to 3,200. It is generally of greater advantage to employ a vinyl lactam polymer containing recurring structural units in which at least one of the R substituents adjacent to the carbonyl group is hydrogen so as to provide active alpha hydrogen sites in the polymer, pursuant to the following representation:

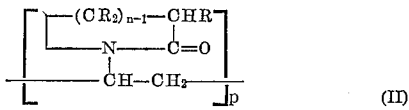

(II)

in which R, $n$ and $p$ are as above. As indicated in the foregoing, it is frequently more beneficial when $p$ has a numerical average value of from about 800 to about 1600.

Besides the species specifically mentioned, other vinyl lactam polymers that can be employed for preparation of the graft copolymers are poly-5-methyl-N-vinyl-2-pyrrolidone, poly-5-ethyl-N-vinyl-2-pyrrolidone, poly-3,3-dimethyl-N-vinyl-2-pyrrolidone, poly-N-vinyl-2-piperidone, poly-3,3-dimethyl-N-vinyl-2-piperidone, poly-3,3-dimethyl-N-vinyl-2-piperidone and the like.

The graft copolymers of the present invention may generally be prepared by methods of polymerization, such as those which have been demonstrated in the foregoing illustrative examples, that employ such polymerization catalysts as persulfates, organic and inorganic peroxide and azo type materials in quantities that are conventional for such uses. The graft copolymers may oftentimes be prepared by polymerizing the monomeric constituent onto the vinyl lactam polymer under the influence of high energy irradiation such as by means of X-rays, and other beta as well as gamma radiation and the like. The graft copolymers may be prepared in both aqueous and organic solvent vehicles using temperatures for the desired polymerization that may vary from about room temperature to the boiling point of the polymerization mixture. It is ordinarily satisfactory to conduct the reaction at a temperature of about 50 to 80 or 100° C. Usually, depending on the specific factors that may be involved, the graft copolymerization may be accomplished satisfactorily within a time period of about 10 to 60 hours.

The compositions of the graft copolymeric additaments that are employed can vary within relatively wide limits. The content of the monomeric acrylamide or methacrylamide, or both, monomeric constituent may advantageously be between about 2 and 50 percent by weight of a graft copolymer, with the polyvinyllactam substrate consisting of the remaining 98 to 50 percent of the polymeric product. In many cases, especially to secure optimum dye-receptivity, about 5 to 20 weight percent of the graft copolymer may consist of the grafted monomeric constituent.

As indicated, the graft copolymeric additaments of the present invention are normally solid water-soluble materials having the indicated and other utilities that form viscous solutions in water. Their solubility in water in general is similar to that of the vinyl lactam polymer substrate or backbone from which they are derived. In some cases, the solubility of the graft copolymer product is somewhat reduced from that of the polyvinyllactam used in its preparation. Ordinarily, the K-value and molecular weight of the graft copolymer product is somewhat higher than that of the vinyl lactam polymer from which it has been derived.

The polymerization system that is employed for the preparation of the graft copolymers used in the present invention may consist of as little as 1 or so to as much as 50 percent by weight of the monomers and vinyl lactam polymers to be polymerized in the aqueous or other medium. The amount of polymerizable constituents that are provided in the copolymerization system may be influenced somewhat by the manner in which it is intended to incorporate the product in the synthetic polymer compositions in order to provide the compositions of the invention. It is generally more desirable for the polymerization system to contain between about 10 and 40 weight percent of graft copolymerizable constituents.

If, for example, it is intended to incorporate the graft copolymer products by blending into a fiber-forming composition prior to its fabrication into shaped articles, the graft copolymerization system may, if desired, contain about equal proportions by weight of the charged polymerizable constituents and the polymerization medium which preferably is miscible with and tolerable in the spinning solution solvent being used. In such cases, the graft copolymer product may ordinarily be obtained as a water-soluble product that, after being dried and isolated from unreacted monomer, may readily be directly incorporated in the fiber-forming composition.

If the incorporation of the graft copolymeric additament in a fiber-forming composition is to be achieved by impregnation therewith of an already-formed shaped article of the composition, it may be desirable to effect the polymerization so as to directly form the polymerization system as a suitable applicating solution of the graft copolymeric product. For such purposes, the polymerization system may be prepared to contain as little as 1 to 5 or 10 percent by weight of the polymerizable monomeric and polymeric ingredients. Such a method for preparing the graft copolymeric additaments that are employed in the present invention may be especially appropriate when they are intended to be applied to acrylonitrile polymer fibers and the like that are derived from aquagels in the course of their manufacture, such as the acrylonitrile polymer fibers that are wet spun from aqueous saline solutions of the fiber-forming polymer. In such cases, it is frequently desirable for the applicating solution of the graft copolymeric additament that is employed to contain from about 1 to 3 weight percent of dissolved polymer solids.

In such instances, as has been demonstrated, the water-soluble graft copolymeric additaments may be impregnated into the fiber while it is in a swollen or gel condition, as an acrylonitrile polymer fiber in an aquagel condition, in order to obtain the desired copolymer-containing product.

If desired, the graft copolymer-containing acrylonitrile polymer compositions may comprise as much as 20 or more percent by weight of the graft copolymeric additament, based on the weight of the composition. Usually, however, suitable properties and characteristics and better fiber-forming properties in a given composition may be achieved when lesser proportions of the graft copolymeric additament are incorporated therein. An appreciable improvement in dye-receptivity and stability may frequently be obtained when a quantity of the graft copolymeric additament that is as small as 2 (and even as low as 1 or less) percent by weight is employed. Advantageously, an amount between about 2 and 15 percent by weight of the copolymeric additament may thus be utilized in the composition. Greater advantages may often accrue when the amount of the copolymeric additament that is incorporated in the composition is in the neighborhood of 4–10 percent by weight, based on the weight of the composition.

As has been indicated, the graft copolymeric additaments may be incorporated in the acrylonitrile polymer compositions according to various techniques. Thus, for example, the copolymeric additament and the acrylonitrile polymer may be directly blended in order to provide the composition which, incidentally, may be used for any desired fabrication purpose in addition to fiber-forming and the like. Beneficially, the polymers may be comminuted, either separately or in combination, before being intimately blended together by mechanical or other means. The blended polymers may be prepared into suitable fiber-forming systems by dissolving or otherwise dispersing them in a suitable liquid medium. Or, the compositions may be provided in fiber-forming system by sequentially dispersing the polymers in any desired order in a suitable medium, as by incorporating the copolymeric additament in a prepared acrylonitrile polymer spinning solution, dope, or the like.

As is evident from the illustrative examples heretofore included, a highly advantageous technique for providing the compositions, particularly when acrylonitrile polymer fiber products are involved, is to apply or impregnate the graft copolymeric additament from an aqueous dispersion thereof to a shaped acrylonitrile polymer article that is in an aquagel condition in a manner similar and analogous to that employed for the impregnation of vinyl lactam polymers as described in the disclosure contained in the copending application of George W. Stanton, Theodore B. Lefferdink, Richard W. Meikle, and Mary J. Charlesworth for a "Method and Composition for Rendering Polyacrylonitrile Readily Dyeable," having Serial No. 333,385, which was filed on January 26, 1953. Thus, an acrylonitrile polymer filamentary article that has been spun from an aqueous saline spinning solution may be conveniently passed, after its coagulation and while it is in an aquagel condition, through a water bath containing the dissolved graft copolymeric additament in order to impregnate the filament with the graft copolymer and provide a composition and an article in accordance with the invention. In addition, in situ polymerization techniques may also be relied upon to provide the graft copolymeric additament in the acrylonitrile polymers in either fabricated or unfabricated form.

The compositions of the invention may advantageously be utilized in or with fiber-forming systems of any desired type in order to provide fibers and the like according to procedures and techniques that are conventionally employed for such purposes in the preparation of fibers and such related shaped articles as filaments, strands, yarns, tows, threads, cords and other funicular structures, ribbons, tapes, films, foils, sheets and the like which may be manufactured from synthetic polymeric materials. It is frequently desirable to employ concentrated solutions of salts or mixtures of salts as the dispersing or dissolving media for such purposes. Such solutions may, as has been indicated, contain at least about 55 percent by weight, based on the weight of the solution, of zinc chloride or other known saline solvents for the polymer. Acrylonitrile polymer fiber products that are spun from saline fiber-forming systems may, by way of further illustration, be coagulated in more dilute saline solutions of a like or similar nature and may then be processed after coagulation according to conventional techniques of washing, stretching, drying, finishing and the like with the modification of the present invention being accomplished prior or subsequent to the spinning as may be desired and suitable in particular instances.

The acrylonitrile polymer fiber products in accordance with the present invention (one of which is schematically illustrated in the sole FIGURE of the accompanying drawing) have excellent physical properties and other desirable characteristics for a textile material and have a high capacity for and are readily and satisfactorily dyeable to deep and level shades with any of a wide variety of dyestuffs. By way of further illustration, they may be easily and successfully dyed according to conventional procedures using acid, vat, acetate, direct, naphthol, sulfur, basic and neutral premetalized dyestuffs.

Such dyestuffs by way of didactic illustration, as Calcocid Alizarine Violet (Colour Index 61710, formerly Colour Index 1080), Sulfanthrene Red 3B (Colour Index Vat Violet 2), Amacel Scarlet GB (Colour Index 11110—also known as Amacel Scarlet BS, and having American Prototype Number 244), Calcodur Pink 2BL (Colour Index 353, also more recently, Colour Index Direct Red 75), Naphthol ASMX (Colour Index 35527), Fast Red TRN Salt (Colour Index Azoid Diazo Component 11), and Immedial Bordeaux G (Colour Index Sulfur Brown 12) may advantageously be employed for such purposes.

Other dyestuffs, by way of further illustration, that may be utilized beneficially on the graft copolymer-containing, polymer blended fiber products of the invention include such direct cotton dyes as Chlorantine Fast Green 5BLL (Colour Index Direct Green 27), Chlorantine Fast Red 7B (Colour Index Direct Red 81), Pontamine Green GX Conc. 125 percent (Colour Index Direct Green 6), Calcomine Black EXN Conc. (Colour Index Direct Black 38), Niagara Blue NR (Colour Index Direct Blue 151) and Erie Fast Scarlet 4BA (Colour Index Red 24); such acid dyes as Anthraquinone Green GN (Colour Index Acid Green 25), Sulfonine Brown 2R (Colour Index Acid Orange 51), Sulfonine Yellow 2G (Colour Index Acid Yellow 40), Xylene Milling Black 2B (Colour Index Acid Black 26A), Xylene Milling Blue FF (Colour Index Acid Blue 61), Xylene Fast Rubine 3GP PAT (Colour Index Acid Red 57), Calcocid Navy Blue R Conc. (Colour Index Acid Blue 120), Calcocid Fast Blue BL (Colour Index Fast Blue 59), Calcocid Milling Red 3R (Colour Index Acid Red 151), Alizarine Levelling Blue 2R (Colour Index Acid Blue 51), Amacid Azo Yellow G Extra (Colour Index Acid Yellow 63), such mordant-acid dyes as Alizarine Light Green GS (Colour Index Acid Green 25); such basic dyes as Brilliant Green Crystals (Colour Index Basic Green 1) and Rhodamine B Extra S (Colour Index Vat Blue 35); such vat dyestuffs as Midland Vat Blue R Powder (Colour Index Vat Blue 35), Sulfanthrene Brown G Paste (Colour Index Vat Brown 5), Sulfanthrene Blue 2B Dbl. paste (Colour Index Vat Blue 5), and Sulfanthrene Red 3B paste (Colour Index Vat Violet 2); various soluble vat dyestuffs; such acetate dyes as Celliton Fast Brown 3RA Extra CF (Colour Index Dispersed Red 13), Artisil Direct Red 3BP and Celanthrene Red 3BN. (both Colour Index Dispersed Red 15), Celanthrene Pure Blue BRS 400 percent (Colour Index Dispersed Blue 1) and Acetamine Yellow N (Colour Index Dispersed Yellow 32); B-Naphthol←2-chloro-4-nitroaniline, an azoic dye; such sulfur dyes as Katigen Brilliant Blue GGS High Conc. (Colour Index Sulf. Blue 9) and Indo Carbon CLGS (Colour Index Sulf. Blue 6); and various premetallized dyestuffs.

The dyed products are generally lightfast and stable to heat and are well imbued with a good resistance to crocking. In addition, the dyed products exhibit good washfastness and retain the dye-assisting graft copolymeric additament in a substantially permanent manner, despite repeated exposure and subjection to washing, laundering and dry cleaning treatments.

What is claimed is:

1. Graft copolymer consisting of between about 2 and and 50 weight percent of (a) an acrylamide monomer of the general formula:

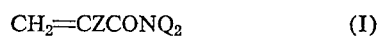

wherein Z is selected from the group consisting of hydrogen and methyl and Q is selected from the group consisting of hydrogen, methyl and ethyl; and (b) from about 98 to 50 weight percent of a N-vinyl lactam polymer.

2. The graft copolymer of claim 1, wherein said N-vinyl lactam polymer is of the formula:

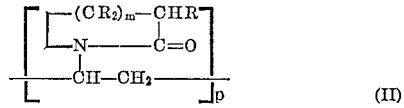

in which each R is independently selected from the group consisting of hydrogen, methyl and ethyl, $m$ is an integer from 2 to 4 and $p$ has a numerical value from about 300 to about 3200.

3. The graft copolymer of claim 1, containing in the polymer molecule between about 5 and 20 percent by weight of said monomer of the Formula I graft copolymerized on the N-vinyl lactam polymer.

4. The graft copolymer of claim 2, wherein said N-vinyl lactam polymer of the Formula II is poly-N-vinyl-2-pyrrolidone.

5. The graft copolymer of claim 1, wherein said monomer of the Formula I is acrylamide.

6. The graft copolymer of claim 1, wherein said monomer of the Formula I is methacrylamide.

7. Method for the preparation of a graft copolymer which comprises polymerizing as the sole polymerizing monomer between about 2 and 50 percent by weight, based on the weight of the resulting graft copolymer, of a monomer of the formula:

$$CH_2=CZCONQ_2 \qquad (I)$$

wherein Z is selected from the group consisting of hydrogen and methyl and Q is selected from the group consisting of hydrogen, methyl and ethyl; in the presence of about 98 and 50 percent by weight of a N-vinyl lactam polymer.

8. Composition comprising a major proportion of at least about 80 percent by weight, based on the weight of the composition, of (A) a polymerized ethylenically unsaturated monomeric material containing at least about 80 percent by weight of polymerized acrylonitrile and (B) a minor proportion of up to about 20 percent by weight, based on the weight of the composition, of a graft copolymer consisting of (a) a monomer of the formula:

$$CH_2=CZCONQ_2 \qquad (I)$$

wherein Z is selected from the group consisting of hydrogen and methyl and Q is selected from the group consisting of hydrogen, methyl and ethyl; and (b) a N-vinyl lactam polymer of the formula:

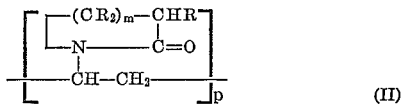

(II)

in which each R is independently selected from the group consisting of hydrogen, methyl and ethyl, $m$ is an integer from 2 to 4 and $p$ has a numerical value from about 300 to about 3200; said graft copolymer containing in its molecular structure between about 2 and 50 percent by weight of said monomer upon from about 98 to 50 percent by weight of said N-vinyl lactam polymer.

9. The composition of claim 8 containing between about 2 and 15 percent by weight, based on the weight of the composition, of said graft copolymer.

10. The composition of claim 8, wherein said graft copolymer contains between about 5 and 20 percent by weight of said monomer of the Formula I graft copolymerized on said N-vinyl lactam polymer of the Formula II.

11. The composition of claim 8, wherein the graft copolymer is acrylamide grafted upon poly-N-vinyl-2-pyrrolidone.

12. The composition of claim 8, wherein the graft copolymer is methacrylamide grafted upon poly-N-vinyl-2-pyrrolidone.

13. The composition of claim 8, wherein the acrylonitrile polymer is polyacrylonitrile.

14. The composition of claim 8, dispersed in a solvent for polyacrylonitrile.

15. A filamentary shaped article having a composition that is set forth in claim 8.

16. Method for the preparation of a dye-receptive, synthetic, linear, hydrophobic polymer composition which comprises immersing an aquagel of a polymerized ethylenically unsaturated monomeric material containing at least about 80 percent by weight of polymerized acrylonitrile in the form of a shaped article into an aqueous solution of from about 1 to 3 weight percent of a graft copolymer consisting of (a) a monomer of the formula:

$$CH_2=CZCONQ_2 \qquad (I)$$

wherein Z is selected from the group consisting of hydrogen and methyl and Q is selected from the group consisting of hydrogen, methyl and ethyl; and (b) a N-vinyl lactam polymer of the formula:

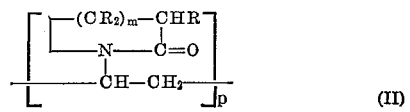

(II)

in which each R is independently selected from the group consisting of hydrogen, methyl and ethyl, $m$ is an integer from 2 to 4 and $p$ has a numerical value from about 300 to about 3200; said graft copolymer containing in the polymer structure between about 2 and 50 percent by weight of said monomer graft copolymerized upon from about 98 to 50 percent by weight of said N-vinyl lactam polymer until between about 2 and 20 percent by weight of said graft copolymer, based on the weight of the resulting composition on a dry weight basis, is incorporated in said aquagel; and drying said graft copolymer-containing aquagel to convert it from the aquagel condition to a finished shaped article form.

17. The method of claim 16, wherein said acrylonitrile polymer is polyacrylonitrile.

References Cited in the file of this patent

UNITED STATES PATENTS

| | | |
|---|---|---|
| 2,417,312 | MacGregor | Mar. 11, 1947 |
| 2,418,696 | Cameron et al. | Apr. 8, 1947 |
| 2,735,830 | Coover | Feb. 21, 1956 |
| 2,776,271 | Coover et al. | Jan. 1, 1957 |
| 2,790,783 | Coover | Apr. 30, 1957 |
| 2,821,519 | Glickman | Jan. 28, 1958 |
| 2,850,478 | Coover et al. | Sept. 2, 1958 |
| 2,882,290 | Coover et al. | Apr. 14, 1959 |
| 2,949,435 | Davis et al. | Aug. 16, 1960 |

FOREIGN PATENTS

| | | |
|---|---|---|
| 775,409 | Great Britain | May 22, 1957 |